UNITED STATES PATENT OFFICE.

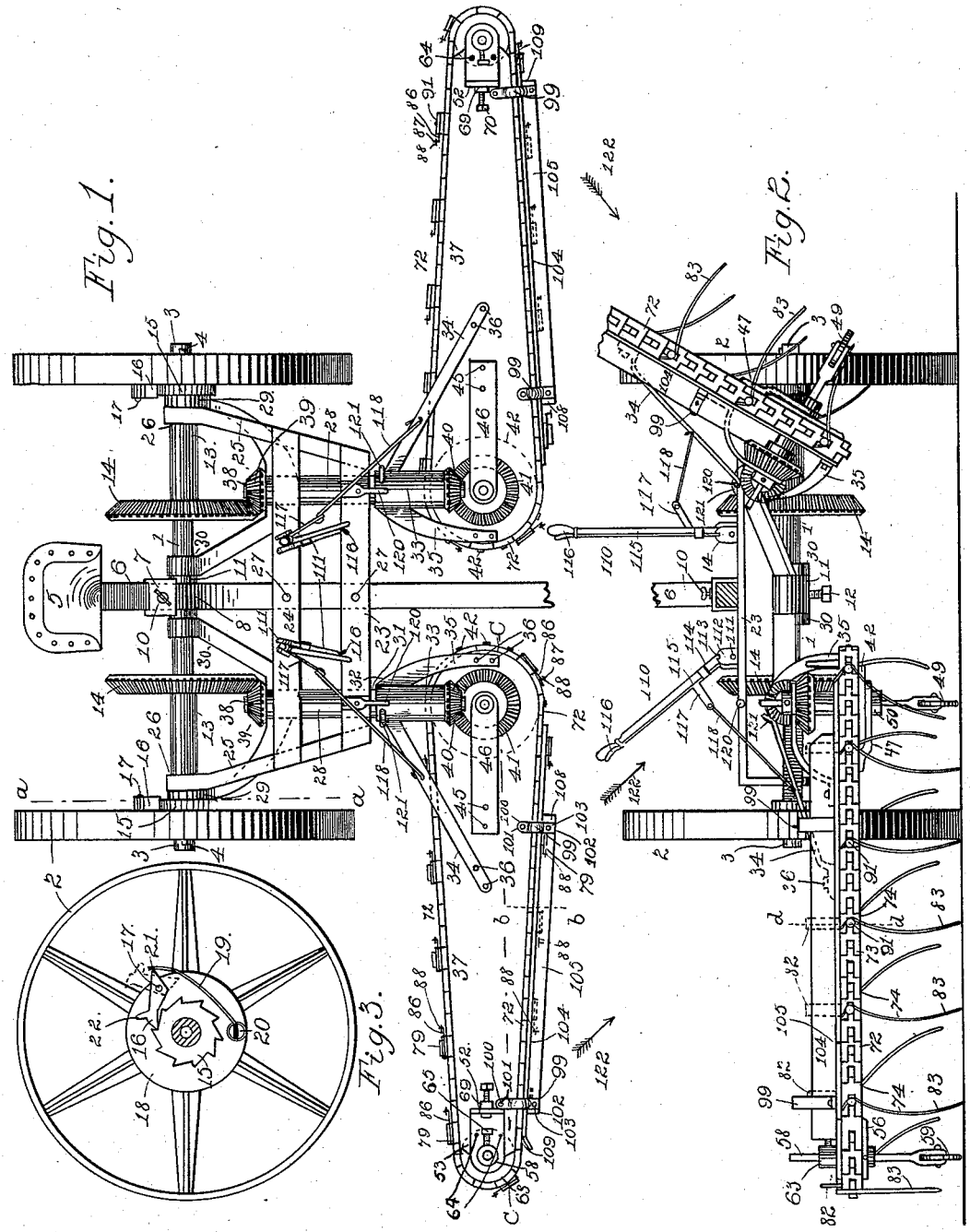

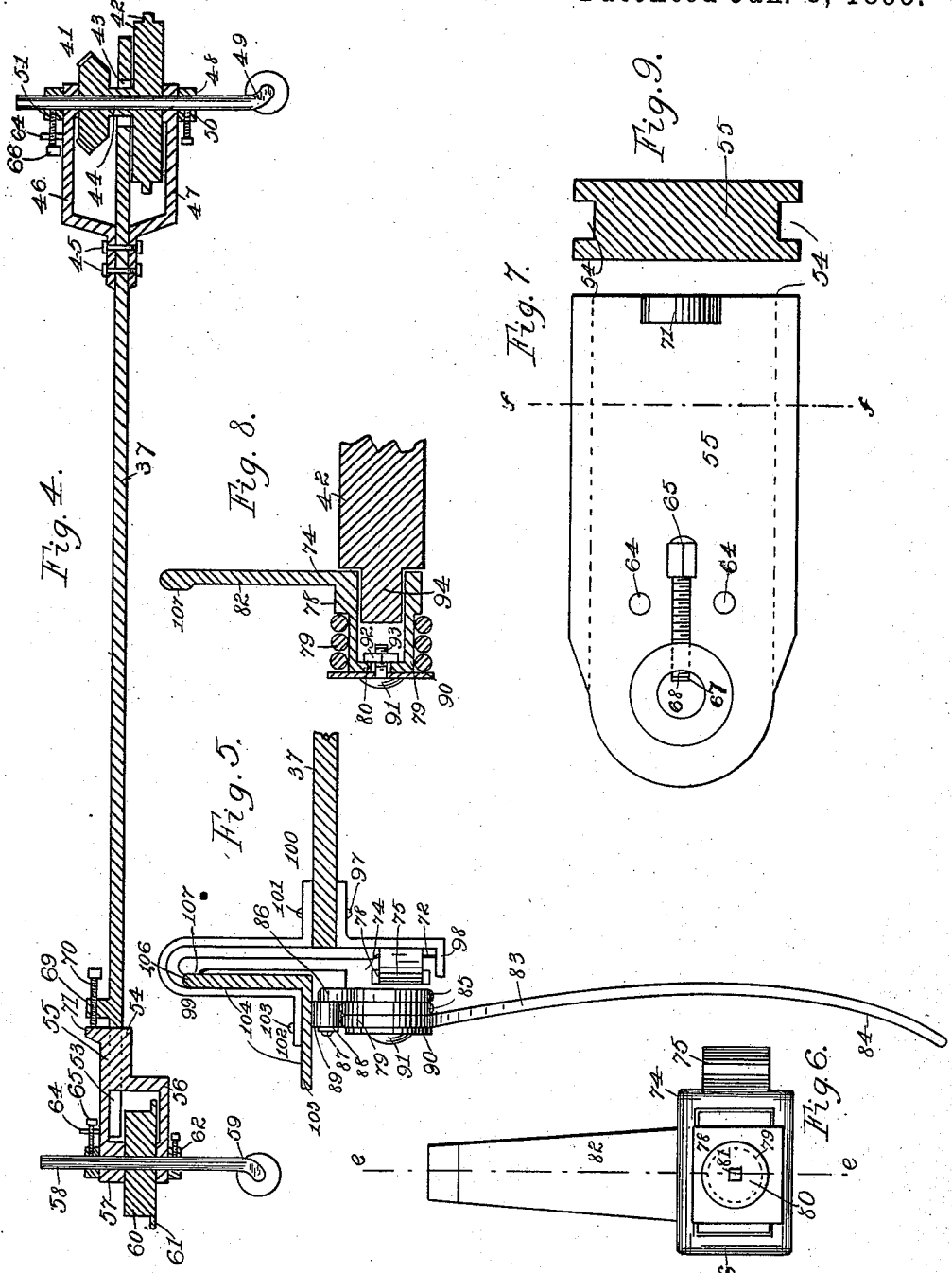

AUGUST E. MATHWICH, OF GAYLORD, MINNESOTA.

HAY-RAKE.

SPECIFICATION forming part of Letters Patent No. 532,079, dated January 8, 1895.

Application filed March 20, 1894. Serial No. 504,454. (No model.)

*To all whom it may concern:*

Be it known that I, AUGUST E. MATHWICH, a citizen of the United States, residing at Gaylord, in the county of Sibley and State of Minnesota, have invented certain new and useful Improvements in Hay-Rakes; and I do declare the following to be a full, clear, and exact description of the invention, such as will enable others skilled in the art to which it appertains to make and use the same, reference being had to the accompanying drawings, and to the figures of reference marked thereon, which form a part of this specification.
My invention relates to improvements in hay rakes of the class drawn by horses or other animals.

The main objects of my invention are, first, to provide a center delivery hay rake of such construction that it will permit the carrier wheels of the machine and the horses to travel between the swaths of hay cut by the mower; secondly, to provide a hay rake that will rake two swaths at a time together upon a third swath, lying still between the horses, thus gathering three swaths into one windrow, delivered from the rear center of the machine, by moving only the two of them, and that as short a distance as possible. I attain these objects by the novel construction and arrangement of parts illustrated in the accompanying drawings, in which—

Figure 1, is a top plan view of my complete machine, with only the front portion of the pole cut away. Fig. 2, is a front elevation of Fig. 1, with the driver's seat cut away, also a portion cut away from the left-hand side rake, which is shown in a raised position, as when the machine is driven through a gate or along a road to and from the field. Fig. 3, is a sectional side elevation on the line $a, a$, in Fig. 1, showing the inner side of one of the carrier wheels, and the ratchet wheel driven by it. Fig. 4, is an enlarged sectional front view on the line $c, c$, in Fig. 1, with the chain and rake tines removed. Fig. 5, is an enlarged sectional side view on the line $b, b$, in Fig. 1, looking from the pole toward the right side of the machine. Fig. 6, is a detail view of one of the special links of a belt chain used in my rake. Fig. 7, is an enlarged top view of an adjustable block for stretching the chain of the rake. Fig. 8, is a central sectional view of the chain link shown in Fig. 6, as on the line $e, e$, and with a few other parts added to it. Fig. 9, is a sectional end view of Fig. 7, on the line $f, f$.

The terms "right" and "left" as used in this specification imply the half of the machine located to the right or left side of the driver, when he sits in proper position on the seat 5.

Referring to the drawings by reference numerals, 1, designates the main axle of the machine.

2, is a pair of carrier wheels, serving also as traction wheels. They are journaled upon the ends 3, of the axle and retained by the pins 4, or by any other suitable means.

5, is the seat for the driver. It is secured to the upper end of a spring arm 6, which at its lower end has a socket 7, encircling the rear portion 8, of the pole 9.

10, is a thumb set screw, screw threaded through the upper side of the socket 7, and engaging the pole. The right and left halves of the machine are so exactly alike that whatsoever is shown or described in one side has its corresponding part in the other side.

11, is a collar secured by the set screw 12, at the middle of the axle 1.

13, is a sleeve journal upon the axle 1, and having upon its inner end secured the bevel gear 14, and upon its outer end the ratchet wheel 15, which is engaged by a ratchet pawl 16, pivoted at 17, to the disk-like inner side 18, of the hub of the wheel. This pawl 16, is held in contact with the ratchet wheel by the spring 19, secured at 20, to the hub 18, and acting against the inner side of the rear end 21, of the pawl.

When the machine is to be drawn without operating the rakes, the operator takes hold of the horn or finger catch 22, of the pawl and raises the pawl up into the position shown in dotted lines in Fig. 3, in which position it is kept by the same spring 17, pressing upon the outer side of the rear end 21, of the pawl, until the pawl is by the operator's hand swung back again into contact with the ratchet wheel.

The two cross bars 23, and 24, and the two hounds 25, form a sulky frame, which is journaled at 26, upon the sleeves 13. The pole 9, is bolted at 27, to the cross bars 23, and 24, and is thereby held some distance above the axle (as shown in Fig. 2).

28, is a sleeve having two rearwardly extending arms 29, and 30, journaled respectively upon the sleeve 13, close by the ratchet wheel 15, and upon the axle 1, close by the collar 11. The sleeve 28, extends forwardly slightly beyond the cross bar 23, where its front end 31, centrally adjoins the rear end 32, of another sleeve 33, provided with two arms 34, and 35, to the front ends of which is secured by the bolts 36, the rake frame proper, which is in the shape of a flat bar or elongated plate 37.

In the sleeves 28, and 33, I journal a shaft 38, which has secured upon its rear end the pinion 39, meshing with the bevel gear 14, and upon its front end the pinion or bevel gear 40, meshing with the bevel gear 41, which (as best shown in Fig. 4), is secured to a sprocket wheel 42, by means of a sleeve-like connection 43, extending through an aperture 44, in the flat frame bar 37, to which is secured by the bolts 45, an upper bracket 46, and a lower bracket 47, in which is journaled the round stem 48, of a caster 49.

50, and 51, are set screwed collars for adjusting the caster 49, up and down according to the softness of the ground on which the rake is used.

The wheels 41, 42, and the sleeve 43, are journaled upon the stem 48, between the brackets 46, and 47.

The outer end of the frame bar 37, has a large angular notch or gap 52, (best shown in Fig. 1) forming two arms 53, upon the inner edges of which are slidingly fitted the grooves 54, of the block or bracket 55, which is provided with the two arms 56 and 57, in which is journaled the stem 58, of another caster 59, with a chain, guiding roller or pulley 60, having the flange 61, interposed between the bracket arms 56, and 57, and being centrally journaled upon the stem 58.

62, and 63 are set-screwed collars for adjusting the caster up and down so as to regulate the contact of the rake tines with the ground whether the latter be soft or hard, and thus may allow the casters to sink more or less into it.

64, are pegs secured a short distance away from each side of the set screws 65, of the collar 63, and 66, of the collar 51. Each of said set screws has its point 67, entered into a guiding groove 68, provided in the side of the stem of each caster (as shown in the enlarged view Fig. 7). The function of the pins 64, is to meet on either side of the screws 65, and 66, and thereby keep the casters in a rearwardly projecting position, allowing them but the necessary rocking motion. Through the lug 69, provided upon the frame bar 37, is screw-threaded the adjustment screw 70, the point of which touches against the lug 71, of the sliding block 55, so that by turning the screw 70, the block or bracket 55, and pulley 60, may be moved outward and stretch the endless belt chain 72, which is passed over the said pulley 60, and the sprocket wheel 42, is drawn by the latter and retained on the pulley 60, by the annular flange 61. The belt chain 72, has some of its links made in the ordinary and well-known style like the links 73, in Fig. 2. Between these links are joined in at suitable intervals the links 74, of which each one is adapted to carry one of the tines of the rake, and for that purpose is of the special construction (best shown in Figs. 5, 6, and 8). It will be seen that this link, besides being formed with the usual hook 75, and rear bar 76, for the next link to engage, has also upon the middle of the link provided a bridge 78, with a cylindrical hollow projection or boss 79, having a bottom 80, with a square aperture 81 in the center.

82, is an upwardly projecting guiding arm provided upon the link for a purpose presently to be fully described.

83, is one of the tines of the rake. It is formed with a slight segmental curve from its point to near the chain, is then bent in coils as 85, around the hollow boss 79, then formed into a horizontal arm 86, with an angularly bent shorter arm or stud 87, upon which is journaled an anti-friction roller 88, retained thereon by a washer 89, secured on the stud by hammering up a burr at the very end of the latter.

90, is a washer for retaining the coils 85, of the rake tine upon the boss 79. It is secured to the boss by a carriage bolt 91, passed through it and through the square hole 81, in the bottom of the boss, and has a nut 92, screwed up tight on its end 93, inside the boss. By this arrangement it will be seen (in Fig. 8) that the tooth 94, of the sprocket wheel 42, finds all the room it needs inside the link with its bridge and box or boss.

To the front edge of the frame bar 37, (as best shown in Fig. 5,) I secure a chain-guiding channel consisting of the double-angled bar 95, having its upper flange 96, bolted or riveted at 97, to the bar 37, and its lower flange or rib 98, projecting forward in under the chain 72.

99, are two brackets or braces made in the shape of an inverted U. Their rear ends 100, are secured by bolts or rivets as 101, to the frame bar 37, and to their front ends 102, I secure by a rivet or bolt as 103, the angle iron 104, of which the horizontal flange 105, bears upon the anti-friction roller 88, and its vertical flange 106, bears against the wearing boss 107, of the arm 82, of the link 74. It will thus be seen that when the tines of the rake move inward by the front edge of the rake bar 37, and is doing the raking, they are by the special chain links and chain guide just described, held firmly in proper position for raking the hay, and as they approach the center or pole of the machine they pass out of the guide and are relaxed, so that they may swing on the boss of the chain links and assume a slanting position, dragging loosely over the hay and the ground from the time they leave (as in Fig. 1) the end 108, of the channel till they enter its other end 109.

110, is a hand lever pivoted at 111, in a bracket 112, having a notch 113, in which engages a locking bolt 114, actuated by a rod 115, and thumb latch 116, of about the ordinary construction used in agricultural machinery. The lever 115, is provided with a transverse arm 117, which by means of the rod 118, is connected to the brace or arm 34, of the sleeve 33, so that when the driver takes hold of the lever and pulls he may raise the rake first from the ground and then swing it up into the raised position shown to the left in Fig. 2, where it is locked by the bolt 114, entering the notch 113, in the bracket 112.

In raising and lowering the rake it is desirable that the caster 49, should be the first one to raise and the last one to come down, as otherwise it might get broken by the tilting of the rake. Hence, I provide upon the front edge of the cross bar 23, a forwardly projecting peg 120, below which, the rocking sleeve 33, is provided with a segmentally bent finger 121, adapted to take hold upon the peg 120, when the rake is raised and tilted out of a level position and to retain its hold until the rake has returned to a horizontal position.

It will be observed that when the casters are on the ground there is a space between the sleeve 28, and the cross bar 23, and that the outer end of the rod 118, is connected to such a point relative to the rake bar 37, or its brace 34, that the outer end of the rake is a trifle the heaviest, so that in lifting the rake the caster 49, lifts first, until the sleeve 28, touches under the bar 23, and arrests the lifting of the inner end of the rake when the outer end is the one to swing upward, thereby shoving the finger 121 upon the peg 120, where it will hang until the downward swinging of the rake permits it to move back and release its hold on the peg, so that the inner end of the rake may descend.

In operation, two horses should preferably be used, one at each side of the pole 9, so that they walk one on each side of a swath. When the rakes are then lowered and the machine drawn forward, the traction wheels 2, will, by means of the pawls 16, ratchet wheels 15, sleeves 13, gear wheels 14, and 39, shaft 38, gears 40, and 41, revolve the sprocket wheel 42, the belt chain 72, and the rake tines 83, thereby raking one swath of hay from each side of the machine in about the direction of the arrows 122, and leaving it upon the central swath, thus forming a windrow, which is delivered from the center of the rear of the machine by the machine straddling over it. When the rakes are lifted from the ground, to be driven a considerable distance, the thumb screw 10, should be loosened and the seat moved back so that the weight of the driver will help to balance the rakes and thus take some of their weight off from the back of the horses.

I do not wish to confine myself as to the exact gearing of the rake, although I prefer at present that the tines of the rake should move inward about as fast as the machine is moved forward.

Having thus described my invention, what I claim, and wish to secure by Letters Patent, is—

1. The center delivery hay raking machine having the pole 9, and sulky frame with a seat for a driver, an axle journaled in said sulky frame, a pair of driving wheels journaled upon the ends of the axle, a right and a left rake section moving on casters in front of each carrier wheel and being held in a transverse position relative to the pole of the machine by frames to which the inner ends of the rakes are journaled so as to swing in a vertical plane for raising up their outer ends, the said frames being journaled to the axle of the machine and adapted to be raised at their front ends, so as to lift the inner ends of the rakes slightly from the ground before elevating the outer ends; each rake having an endless belt-chain operated by a sprocket wheel, geared to and operated by the driving wheels; the rake teeth or tines secured to the chain at suitable intervals and guided so as to rake only when moving toward the center of the machine, substantially as shown and described and for the purpose set forth.

2. In a hay rake the combination of the axle 1, the carrying and driving wheels 2, having the spring-actuated pawl 16, the ratchet wheel 15, sleeve 13, bevel gears 14, 39, 40, and 41, the shaft 38, the sleeves 28, having the arms 29, and 30, journaled upon the shaft, the sleeve 33, having the arms 34, and 35, the sprocket wheel 42, secured to the bevel gear 41, the frame bar or plate 37, the chain sheave 60, an endless belt chain passed over said sheave 60, and the sprocket wheel 42, and carrying secured to some of its links, rake tines as 83; suitable guides for holding the tines in raking contact with the ground when moving toward the center of the machine and suitable wheels or casters for supporting the rake, and means for raising the rakes, substantially as shown and described.

3. In a hay raking machine and suitably connected and geared to a driving wheel, the rake section having the frame bar or plate 37, the brackets 46, 47, the caster 49, with the long stem 48, journaled in the brackets; the adjustment collars 50, and 51, for raising or lowering the caster, the pegs 64, and set screw 66, for limiting the rocking of the casters, the bevel gear 41, and sprocket wheel 42, secured together and journaled upon the stem 48; the chain-stretcher block 55, slidingly mounted in the outer end of the bar 37, the lug 69, and adjustment screw 70, said block 55, having the arms 56, and 57, the caster 59, having the long stem 58, journaled in said arms, the adjustment collars 62, and 63, for raising or lowering the caster, the set screw 65, and the pins 64, the chain sheave 60, having the flange 61, and being journaled upon the stem 58; the chain guiding channel provided at the front edge of the bar 37, and consisting of the brackets 99, the angle iron 104, and the double angled iron 95, arranged and secured as shown; the belt chain 72, having some of its links made with the guiding arm 82, the bridge 78, and cylindrical box 79, having a square hole as 81, in its bottom 80; the rake tooth or tine 83, having the coils 85, encircling the box 79, of the link and having the horizontal arm 86, the free end of which is bent at right angle with the arm, and provided with an anti-friction roller as 88, the washer 90, the bolt 91, and nut 92, for retaining the coiled portion of the tine pivotally upon the box of the link, substantially as shown and described and for the purpose set forth.

In testimony whereof I affix my signature in presence of two witnesses.

AUGUST E. MATHWICH.

Witnesses:
F. M. NORTON,
A. W. STERNKE.